United States Patent
De'Angeli et al.

(10) Patent No.: US 11,861,697 B1
(45) Date of Patent: Jan. 2, 2024

(54) DISTRIBUTED LEDGER FOR LETTER OF CREDIT TRACKING

(71) Applicant: United Services Automobile Association (USAA), San Antonio, TX (US)

(72) Inventors: Sacha Melquiades De'Angeli, San Antonio, TX (US); Philip Andrew Leal, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 282 days.

(21) Appl. No.: 16/570,658

(22) Filed: Sep. 13, 2019

Related U.S. Application Data

(60) Provisional application No. 62/731,585, filed on Sep. 14, 2018.

(51) Int. Cl.
| | |
|---|---|
| *G06Q 40/03* | (2023.01) |
| *H04L 9/06* | (2006.01) |
| *H04L 9/30* | (2006.01) |
| *H04L 9/00* | (2022.01) |

(52) U.S. Cl.
CPC ........... *G06Q 40/03* (2023.01); *H04L 9/0637* (2013.01); *H04L 9/0643* (2013.01); *H04L 9/30* (2013.01); *H04L 9/50* (2022.05); *H04L 2209/56* (2013.01)

(58) Field of Classification Search
CPC ....... G06Q 40/025; H04L 9/0643; H04L 9/30; H04L 9/0637; H04L 2209/38; H04L 2209/56

USPC .......................................................... 705/64
See application file for complete search history.

(56) References Cited

U.S. PATENT DOCUMENTS

| | | | |
|---|---|---|---|
| 10,055,446 B2 * | 8/2018 | Pattanaik et al. | G06F 17/00 |
| 10,102,265 B1 * | 10/2018 | Madisetti et al. | G06F 17/00 |
| 10,114,969 B1 * | 10/2018 | Chaney et al. | G06F 21/62 |
| 2008/0066184 A1 * | 3/2008 | Ben-Ami et al. | H04L 9/32 726/27 |
| 2017/0364552 A1 * | 12/2017 | Pattanaik et al. | G06F 17/30 |
| 2017/0366516 A1 * | 12/2017 | Pattanaik et al. | H04L 29/06 |
| 2018/0101848 A1 * | 4/2018 | Castagna et al. | G06Q 20/40 |
| 2018/0227118 A1 * | 8/2018 | Bibera et al. | H04L 9/08 |
| 2018/0268479 A1 * | 9/2018 | Dowling et al. | G06Q 40/02 |
| 2018/0285879 A1 * | 10/2018 | Gadnis et al. | G06Q 20/40 |

(Continued)

OTHER PUBLICATIONS

Sachin Sawashe, Blockchain For Letter of Credit, Aug. 24, 2019, Altcoin Magazine, The Capital Platform. (Year: 2019).*

*Primary Examiner* — Bennett M Sigmond
*Assistant Examiner* — George Proios
(74) *Attorney, Agent, or Firm* — Fletcher Yoder, P.C.

(57) ABSTRACT

Techniques are described for determining and tracking fractional ownership interests in an asset, using a distributed ledger. Shares in an asset, such as a house, may be offered for sale through a marketplace. Sales of the shares, and information regarding the asset, may be tracked using a distributed ledger system, such as one or more blockchains that provide immutable and secure data storage distributed across a plurality of nodes. Embodiments provide individuals with liquidity options and/or pricing options for selling shares in their home, allowing individuals to securitize interest in their own equity in the home and pre-sell shares in some of that equity without selling the entire property and without taking out a loan.

19 Claims, 5 Drawing Sheets

(56) References Cited

U.S. PATENT DOCUMENTS

| | | | | |
|---|---|---|---|---|
| 2018/0343114 | A1* | 11/2018 | Ben-Ari | H04L 9/08 |
| 2018/0349621 | A1* | 12/2018 | Schvey et al. | G06F 21/62 |
| 2019/0052466 | A1* | 2/2019 | Bettger | H04L 9/32 |
| 2021/0067495 | A1* | 3/2021 | Yuting et al. | H04L 29/06 |

* cited by examiner

DISTRIBUTED LEDGER FOR LETTER OF CREDIT TRACKING

CROSS-REFERENCE TO RELATED APPLICATION

This application claims priority to and the benefit of U.S. Provisional Application No. 62/731,585 entitled "DISTRIBUTED LEDGER FOR LETTER OF CREDIT TRACKING," filed Sep. 14, 2018, which is hereby incorporated by reference in its entirety for all purposes.

BACKGROUND

The present disclosure relates generally to letter of credit tracking, and more particularly to systems and methods for letter of credit tracking via a distributed ledger.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A traditional letter of credit may be issued by a first bank to a second bank to serve as a bank guarantee, for example, of large payments made to a specified entity under certain specified conditions. For example, the first bank may guarantee that an office building buyer's payment will be received on time, and for the correct amount by the second bank. Should the payment not be received as specified, the first bank would then cover any differences. However, the high transactional costs (e.g., friction) of offering and managing letters of credit has presented such systems from being available to the general public. The techniques described herein may provide for improvement in systems and methods for letters of credit.

BRIEF DESCRIPTION

The techniques described herein are generally directed at creating and updating letters of credit. More particularly, embodiments of the present disclosure are directed to using a distributed ledger, such as a blockchain, to provide an immutable or otherwise unchangeable record of the letters of credit described herein without involving third party entities, such as third-party data collectors, banks, and so on. The distributed ledger may further provide for crypto security features and for records that may be verified to provide for enhanced security and trust. Additionally, letter of credit transactions may be automatically validated, signed and updated through blockchain techniques, eliminating middlemen and providing for enhanced transactional efficiencies.

The letter of credit may contain information related to an entity, including an individual, a corporation, a club, and so on. Entity information may include credit history information, life insurance information, health insurance information, health records, vehicle insurance histories, property insurance histories, renter history, employment information, and so on. The stored information may be provided via degrees of granularity. For example, rather than providing the entire letter of credit information, a query regarding credit history may provide only credit history information as a result. The letter of credit may be updated as transactions occur (e.g., purchase of a house, purchase of insurance, doctor's visits, and so on) and the updates may then be stored in the distributed ledger. By providing for a distributed ledger-based letter of credit, the techniques described herein may result in improved transactional efficiencies and the elimination of certain third party middlemen entities.

In a first embodiment, a system includes a first processor and a first memory communicatively coupled to the first processor. The memory stores instructions which, when executed, cause the first processor to perform operations including establishing, via a cryptographic system, an encrypted relationship, an encrypted transaction, or a combination thereof, between a first entity and a second entity. The operations further include storing the encrypted relationship, the encrypted transaction, or the combination thereof, in a least one block of digital distributed ledger system. The operations additionally include distributing the at least one block among nodes of the digital distributed ledger system, wherein the digital distributed ledger system is configured to immutably store the encrypted relationship, the encrypted transaction, or the combination thereof.

In a second embodiment, a method performed by at least one processor includes establishing, via a cryptographic system, an encrypted relationship, an encrypted transaction, or a combination thereof, between a first entity and a second entity. The method further includes storing the encrypted relationship, the encrypted transaction, or the combination thereof, in a least one block of digital distributed ledger system. The method additionally includes distributing the at least one block among nodes of the digital distributed ledger system, wherein the digital distributed ledger system is configured to immutably store the encrypted relationship, the encrypted transaction, or the combination thereof.

In a third embodiment, one or more non-transitory computer-readable storage media, is provided, the media storing instructions which, when executed, cause at least one processor to perform operations including establishing, via a cryptographic system, an encrypted relationship, an encrypted transaction, or a combination thereof, between a first entity and a second entity. The instructions further cause the at least one processor to perform operations including storing the encrypted relationship, the encrypted transaction, or the combination thereof, in a least one block of digital distributed ledger system. The instructions additionally cause the at least one processor to perform operations including distributing the at least one block among nodes of the digital distributed ledger system, wherein the digital distributed ledger system is configured to immutably store the encrypted relationship, the encrypted transaction, or the combination thereof.

In general, implementations of innovative aspects of the subject matter described in this specification can be embodied in an electronic distributed ledger that may keep track of one or more letters of credit, including information and transactions related to an entity or entities "holding" the letter of credit. For example, a first entity (e.g., customer) may enter into a relationship, a transaction, or the like, with a second entity (e.g., institution such as a bank). The relationship, for example, may be captured and encrypted as further described below. The encrypted relationship (transaction, or the like) may then be stored in a distribute ledger. The distributed ledger may provide for a secure, immutable system of maintain letter of credit information. When desired, the encrypted relationship may be verified by a third entity, for example, via certain cryptographic techniques.

These and other implementations can each optionally include one or more of the following innovative aspects: the actions further include adjusting the price per share based on the purchase of the one or more shares; the actions further include updating the asset descriptor record to include the adjusted price per share; the asset is a building; the actions further include providing a user interface (UI) that presents information describing the asset, the available number of shares, and the price per share; the request to purchase one or more shares is received through the UI; the actions further include determining a value of the asset based on a total number of shares in the asset and the price per share; the actions further include providing a user interface (UI) that presents information describing the asset, including the value of the asset; the actions further include storing an owner descriptor record on the distributed ledger, the owner descriptor record describing an entity that initially owns the asset; and/or the owner descriptor record is associated with the asset descriptor record.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. Through use of smart contract(s) executing to access data on a distributed ledger, implementations provide an inexpensive, reliable, secure mechanism for accessing asset share data and managing sales of shares, thus making efficient use of processing power, memory, storage space, network bandwidth, and/or other computing resources.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Embodiments of the present disclosure are directed to systems, devices, methods, and computer-readable media for creating, maintaining, and tracking letters of credit using a distributed ledger. Letters of credit may include information, such as credit history, life insurance information, health information, vehicle information, property information, rental history, employment history, and the like, useful in establishing an entity's reputation, payment history, and financial record. Information stored in the letter of credit may be tracked using a distributed ledger system, such as a system that includes one or more blockchains. The blockchain(s) provide immutable and secure data storage, which may be distributed across a plurality of computing systems or nodes. As new transactions occur, the new transactions may be included in the distributed ledger system, thus "growing" the letter of credit throughout the lifetime of the entity. The distributed ledger system, such as one or more blockchains, may be used to store the letter of credit information, including new transactions, more efficiently and inexpensively. The distributed ledger system also provides security, such that only authorized individuals and/or processes can access the data stored on the distributed ledger system. The distributed ledger system also provides immutability, such that data records written to the distributed ledger may not be changed or removed once written.

In certain embodiments, a blockchain may be used as a public or private ledger of all transactions that have been executed for the tracked asset. The blockchain may grow as new blocks are added based on a new set of transactions. In some examples, a single block is derived from multiple transactions. In general, blocks are added to the blockchain in a linear, chronological order by one or more computing devices in a peer-to-peer network of interconnected computing devices that execute a blockchain protocol. The peer-to-peer network may be described as a plurality of interconnected nodes, each node being a computing device that uses a client to validate and to relay transactions to other nodes. Each node may maintain a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities should agree on which transactions have actually occurred, and in which order. For example, should two entities observe different transaction histories, they will be unable to come to the same conclusion regarding the validity of a transaction. The blockchain techniques described herein enable all entities to come to an agreement as to transactions that have already occurred, and in which order. As described in further detail below, a ledger of transactions for a tracked letter of credit is agreed to based on the amount of work (e.g., computing work such as hashing) required to add a transaction to the ledger of transactions (e.g., add a block to the blockchain). Blockchains may also employ other protocols, for example, that may define "work" differently. The work may be a computing task that may be difficult for any single node (e.g., computing device) in the peer-to-peer network to complete quickly, but is relatively easy for any node (e.g., computing device) to verify.

The peer-to-peer network may include multiple "miners" (e.g., computing devices) that add blocks to a blockchain based on the blockchain protocol. In general, multiple miners validate transactions that are to be added to a block, and compete (e.g., perform computing work, as introduced above) to have their respective block added to the blockchain. Validation of transactions includes verifying digital signatures associated with respective transactions. For a block to be added to the blockchain, a miner must demonstrate a proof of work before their proposed block of transactions is accepted by the peer-to-peer network, and before the block is added to the blockchain. In certain embodiments, a blockchain protocol include a proof of work scheme that is based on a cryptographic hash function (CHF). An example CIF includes the secure hash algorithm 256 (SHA-256). In general, the CIF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CIF can include a reference to the previous (most recent) block in the blockchain, details of the transaction(s) that are to be included in the to be created block, and a "nonce" value (e.g., a random number used only once).

Multiple nodes may compete to hash a set of transactions and to provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CIF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner produce hundreds of thousands (or more) of hash values, before any one miner provides a qualifying hash value (e.g., at least the first four characters of the hash value are each zero).

In some embodiments, the distributed ledger or blockchain system can include one or more sidechains. A sidechain may be described as a blockchain that validates data from other blockchains. In some examples, a sidechain may provide for granularity of information so that different information "types", (e.g., health information, asset information, rental information, and so on) may be stored in a different sidechain linked to a main chain. The blockchain may be a public blockchain, such that data stored on the blockchain is generally accessible. The blockchain or portions of the blockchain may alternatively or additionally be a private blockchain, such that the stored data is accessible only to authorized individuals and/or processes on the blockchain. By providing for letters of credit via blockchains, as further described below, enhanced transactional efficiencies, security, and information flows may be provided.

Figure 1:
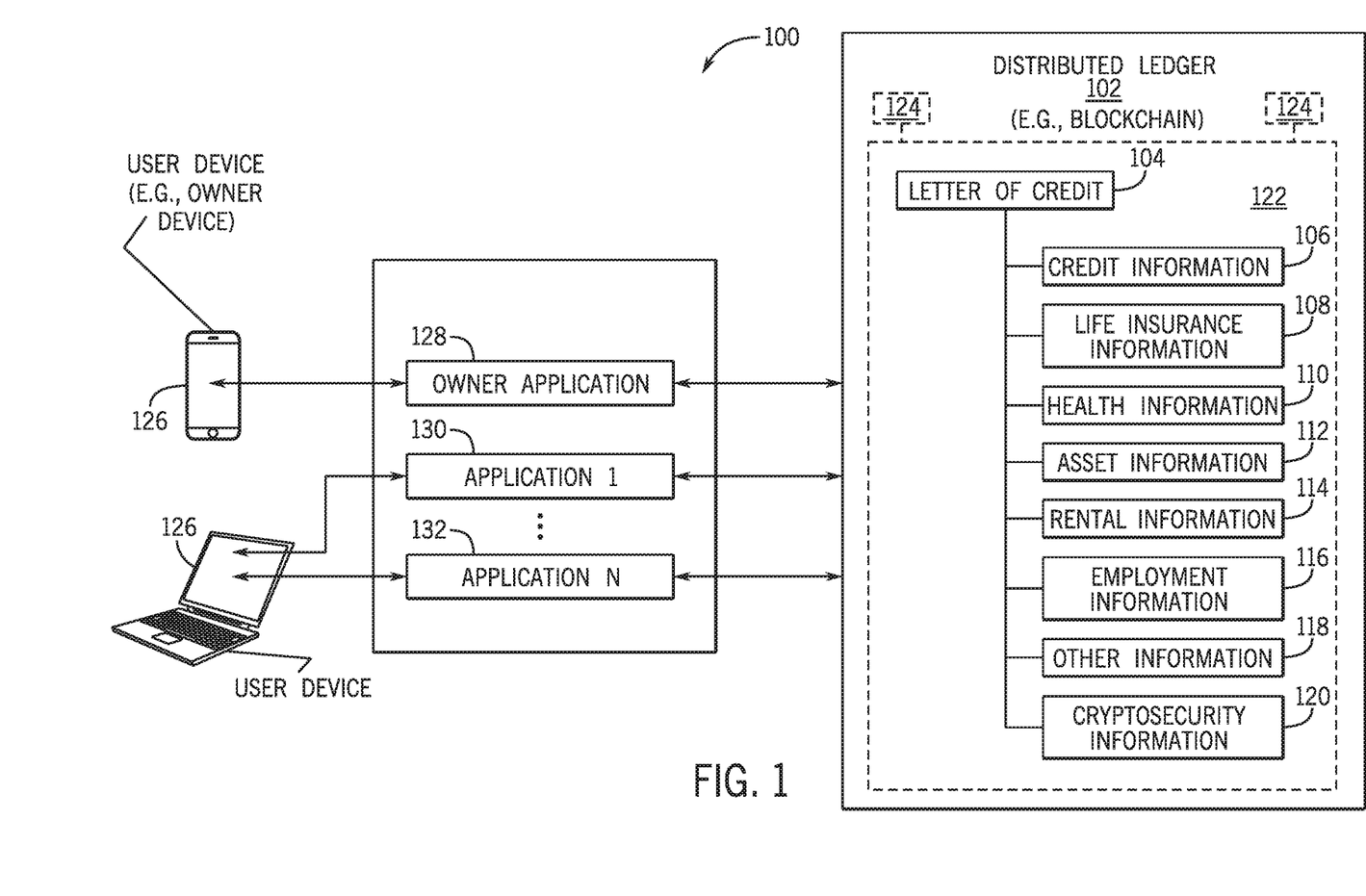
FIG. 1 depicts an embodiment of a system for letter of credit creation and management, according to aspects of the present disclosure.

FIG. 1 depicts an embodiment of a system 100 for letters of credit creation and tracking, according to aspects of the present disclosure. As shown in the example of FIG. 1, the system 100 may include a distributed ledger system 102 that may include one or more blockchains. The distributed ledger system 102 may be hosted on any suitable number of computing devices that operate as nodes for the distributed ledger system 102. Such nodes may be geographically distributed in any suitable number of locations.

The distributed ledger system 102 may store any appropriate number of data records of various types, including letters of credit records 104. A letter of credit record 104 may include information that describes a particular entity, such as an individual, a corporation, a club, and so on. For example, a letter of credit record 104 may include a unique identification, such as cryptographic key(s), certificates of trust, and the like, that uniquely identifies an entity from other entities in the system 100. A letter of credit record 104 may additionally include or be linked to subrecords, such as credit information (e.g., credit history) records 106, life insurance records 108, health records 110, asset records 112 (e.g., vehicle(s), properties (real and/or personal), rental history records 114, employment records 116, and so on. Records 118 may also include other information useful, for example, in deriving a factor (e.g., reputation factor) for the entity listed as the owner of the letter of credit record 104.

The letter of credit record 104 may include information for the owning entity, which may be individual(s), corporations, groups, clubs, and so on. For example, the letter of credit record 104 may include the name of the owner(s), contact information (e.g., address, telephone number, email address, etc.), an identification number, and so forth. The credit information record 106 may include information regarding the owner's credit status, outstanding debts, credit rating, cash flow, ability to buy back assets, and so forth. The life insurance information record 106 may type of life insurance held (e.g., term life, universal life, whole life), payment history, equity, beneficiaries, premiums, investment options, payout options, and so on. The health information record 110 may include health insurance information, age, medical history, doctor information, emergency contact information, prescription information, and so on.

The asset information record 112 may have information related to assets such as real property information (e.g., deeds, liens, description of property), vehicle(s), personal assets (e.g., jewelry, clothing, furniture, electronics), asset insurance information, and so on. The rental information record 114 may include information related to rental history of real property such as apartments and/or homes, as well as information to provide a landlord during rental applications, such as age, income information, and so on. The employment history information record 116 may list previous employers, letters of recommendation, positions held, resume information, and so on. The other information record 118 may include items such as school transcripts, spouse information, trust ratings, and so on. It is to be understood that the records 104-118 may adhere to jurisdictional laws or rules relating to privacy and record keeping, such as the United States' Health Insurance Portability and Accountability Act (HIPAA), the European Union's General Data Protection Regulation (GDPR), US-EU Privacy Shield regulations, and so on. In certain embodiments, the letter of credit record 104 may also be associated with or include cryptosecurity information records 120, such as keys and/or certificates. The cryptosecurity information records 120 may be used, as further described below, to document certain relationships, transactions, and/or information between entities, as well as to present information (e.g., records 104-118) to new entities.

In some embodiments, the distributed ledger system 102 may include a main blockchain 122 and one or more sidechains 124 that are linked to the main blockchain 122. In some embodiments, a sidechain 124 may be used to store certain record types. For example, a credit information sidechain 124 may store only credit information records 106. Likewise, a life insurance information sidechain 124 may store only life insurance information records 108. By using sidechains 124 dedicated to specific record types 106-120, the techniques described herein may enable a more efficient record allocation in the distributed ledger 102. Further, in some embodiments, a side chain may be managed by other entities, for example, health information side chains 124 may be managed by a health entity such as a hospital.

One or more computing devices 126 may have access to the distributed ledger system 102. In some instances, the computing devices 126 may be nodes that host a portion of the distributed ledger. Alternatively, the distributed ledger may be hosted on computing device(s) other than the computing devices 126. The computing devices 126 may include any suitable type of computing device, including portable computing devices (e.g., smartphone, tablet computer, wearable computer, etc.), workstations, desktop computers, servers, and so on.

An owner of the letter of credit 104 may use an owner application 128 to get full access the letter of credit 104. That is, the owner application 128 may include graphical user interface (GUI) features (e.g., screens, menus, textboxes, and the like), along with functionality to view all the data in the records 104-120 and to enter new records 104-120. Other user applications 130 and 132 are shown. It is to be understood that while three applications 128, 130, 132 are shown, the techniques described herein may include more than three applications. The applications 130 and 132 may be used to provide read and/or write access to the records 106-120 from other entities, such as banks, hospitals, insurance agencies, non-governmental entities (NGOs), government agencies, and so on. In certain embodiments, the applications 130, 132 may be entity-based. That is, hospitals may use an application that is designed to focus on health information records 110, for example. Likewise, landlords may use an application that is designed to focus on rental information records 114, and so on. In addition to or alternative to entity-based applications, the applications 130, 132 may be based on providing certain functions, such as credit checks, verification of asset ownership, employment checks, and so on. Accordingly, a variety of entities may participate in transactions and/or queries of the letter of credit 104, providing for a platform to enhance transactional efficiencies and improve collaboration between entities that would benefit from information in the records 104-120.

Use of a distributed ledger-based system 102 (e.g., blockchain system) provides for letter of credit information management that is fast, inexpensive, ubiquitous, secure, and immutable. Accordingly, use of the distributed ledger system enables implementations to forego the need for a middleman that may act as a broker of letter of credit information and/or act to manage credit information, insurance information, rental information, and so forth. The records 104-120, once written, will remain part of the distributed ledger and be retrievable at any time. Indeed, the records 104-120 may only grow, and thus provide for an immutable, time-based view of the information stored therein. Accordingly, embodiments enable letter of credit information to be stored on the distributed ledger 102 in a manner that is more secure, immutable, and readily accessible (e.g., auditable) than traditional titles stored in vulnerable paper form at banks, escrow agencies, and so on.

Figure 2:
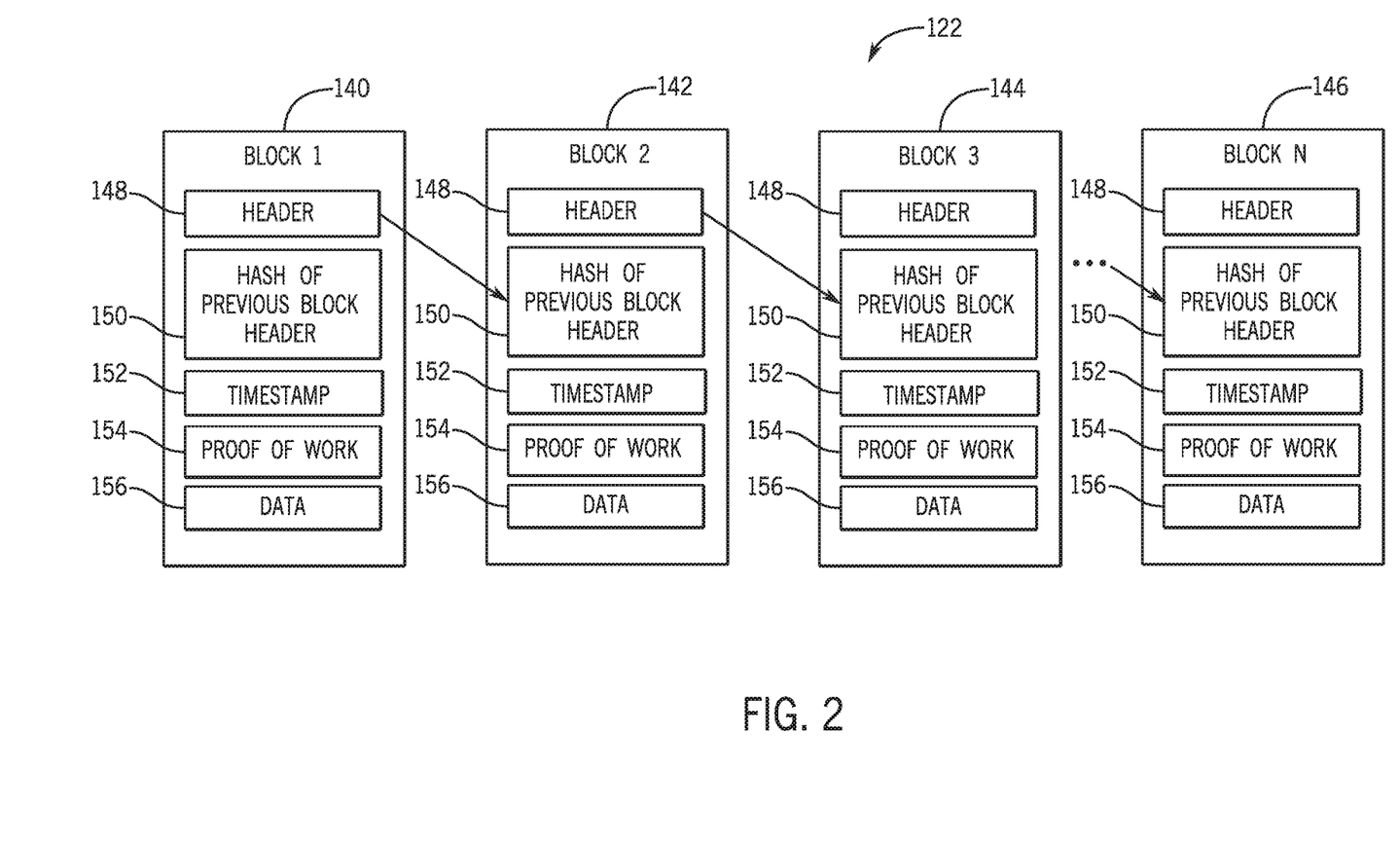
FIG. 2 illustrates a block diagram of an embodiment of a blockchain, according to aspects of the present disclosure.

FIG. 2 is a diagram depicting an embodiment of the blockchain 122. In the depicted embodiment, the blockchain 122 is illustrated as having multiple blocks 140, 142, 144, and 146. The block 140 (first block in the blockchain 122) may have been created, for example, and allocated as a special starting block. The block 140 may include a unique header 148 uniquely identifying the block 140 from other blocks in the blockchain 122. Because the block 140 is the first block in the blockchain 122, a hash of a previous block header 150 may be set to zero. A timestamp 152 may include the date of creation for the block 140, and a proof of work section 154 may include certain "work" that proves that a "miner" has performed work suitable for the creation of the block 140 and/or to verify transactions in the blockchain 122. The work section 154 may vary based on a protocol used to create the blockchain 122. For example, a bitcoin protocol may use a Merkle tree. The Merkle tree may be a tree data structure in which every leaf node is labelled with a hash (e.g., one-way hash) of a data block and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from our verified blockchain 122, and so on, down the tree. In other words, there's no way to create a fake value that would hash to our expected Merkle tree value (e.g., value stored in section 154 of the block 140), thus creating a single value that proves the integrity of all of the transactions under it.

Data, such as records 104-120, may be stored in a section 156 (and/or in another section). In certain embodiments, a new block may be created when a new record 104-120 is to be created. For example, a new credit information record 106 may result in the creation of a new block. In another embodiment, empty blocks may be first created and then assigned to new records 104-120. When a new block is created, the block will receive a new header 148 uniquely identifying the new block. As mentioned earlier, a peer-to-peer network may include multiple "miners" (e.g., computing devices 126) that add blocks to the blockchain 122 based on the blockchain protocol. In general, multiple miners validate transactions or data 156 that are to be added to a block, and compete (e.g., perform computing work, as introduced above) to have their respective block added to the blockchain 122. Validation of transactions and/or data includes verifying digital signatures associated with respective transactions and/or data 156. For a block to be added to the blockchain 122, a miner must demonstrate a proof of work before their proposed block of transactions is accepted by the peer-to-peer network, and before the block is added to the blockchain 122. In certain embodiments, a blockchain protocol include a proof of work scheme (e.g., Merkle Tree) that is based on a cryptographic hash function (CHF). An example CIF includes the secure hash algorithm 256 (SHA-256). In general, the CIF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CIF. For example, the input to the CIF can include a reference to the previous (most recent) block (e.g., hash 150) in the blockchain 122, details of the transaction(s) or data 156 that are to be included in the to be created block, and a "nonce" value (e.g., a random number used only once).

Multiple nodes may compete to hash a set of transactions and to provide the next block that is to be added to the blockchain 122. The blockchain protocol may provides a threshold hash to qualify a block to be added to the blockchain 122. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 122. Each miner provides the reference to the previous (most recent) block in the blockchain 122, details of the data or transaction(s) 156 that are to be included in the to-be-created block, and the nonce value to the CIF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain 122. Consequently, the respective miner's block is broadcast across the peer-to-peer network (e.g., all devices 126 communicatively coupled to the system 102). All other miners cease work (because one miner was already successful), and all copies of the blockchain 122 are updated across the peer-to-peer network to append the block to the blockchain 122. Each miner produce hundreds of thousands (or more) of hash values, before any one miner provides a qualifying hash value (e.g., at least the first four characters of the hash value are each zero).

It is to be noted that any computing device, such as devices 126 may be miners. Accordingly, as new records 104-120 are created, new blocks are added to the blockchain 122, including blocks 140, 142, 144, and 146. Indeed, the blockchain 122 may continue to grow, storing new records 104-120. Because of the distributed nature of the peer-to-peer network created via the distributed ledger system 102, each node (e.g., computing devices 126) may include copies of the blockchain 122 and share copies of the blockchain 122 as new peers enter the peer-to-peer network. Each copy of the blockchain 122 may include verified information (e.g., records 104-122) for all or substantially all of the information tracked by the distributed ledger system 102. The information is secure, immutable, and more efficiently tracked as new assets get added via the distributed ledger system 102. Accordingly, relationships, transactions, or information between entities may be captured, as shown in FIG. 3.

Figure 3:
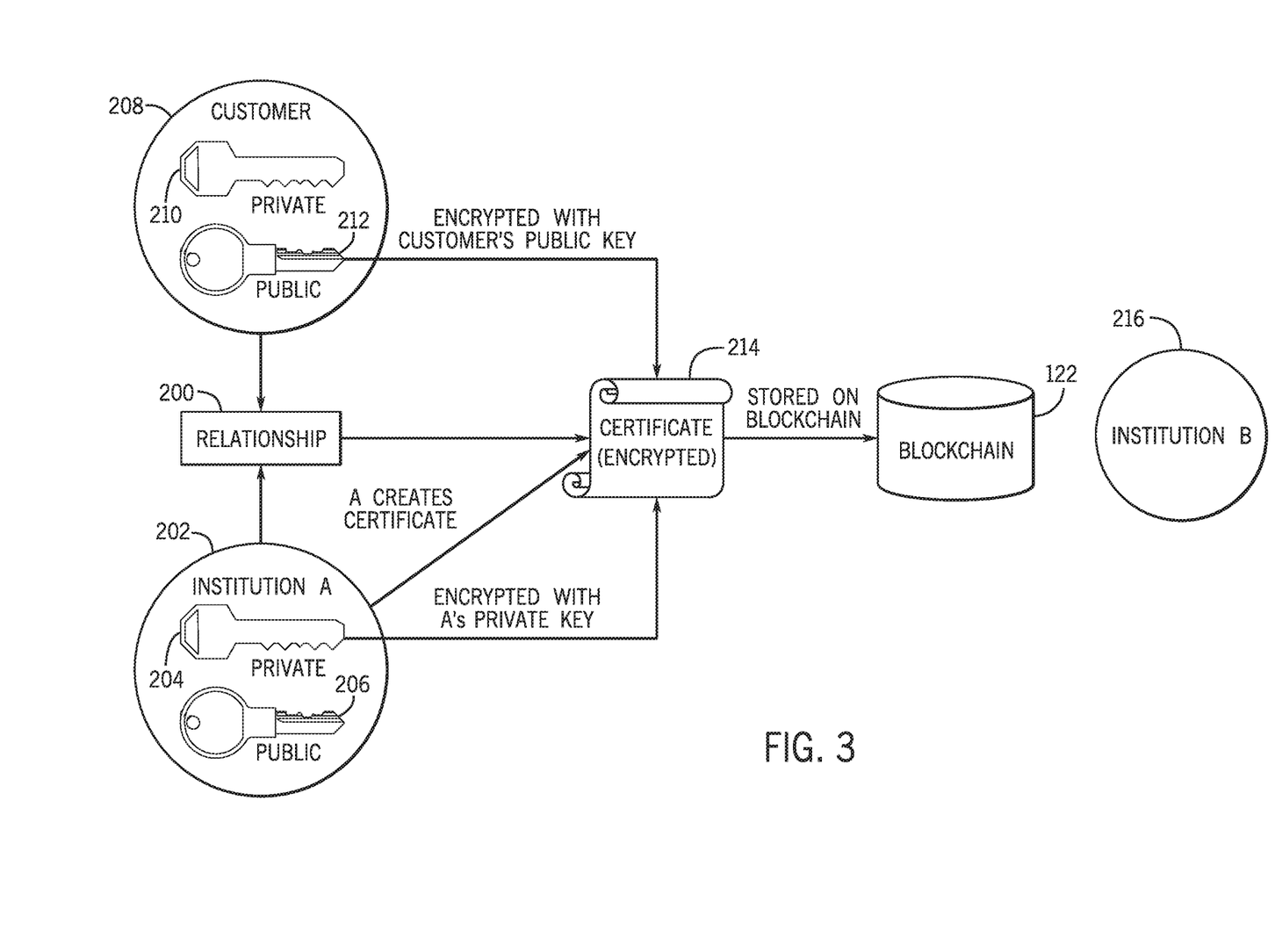
FIG. 3 illustrates an information flow diagram of an embodiment of an information flow process suitable for storing certain multi-entity data in a digital distributed ledger system, according to aspects of the present disclosure.

FIG. 3 depicts an embodiment of information flow diagram depicting the creation and storage of certain multi-entity data 200. The multi-entity data 200 may include transactions, relationships, and more generally, information such as information previously described with respect to records 104-120. Relationships may include financial relationships, (e.g., lender/borrower relationships, escrow relationships, purchasing agent relationships, buyer agent relationships, and so on), insurance relationships (e.g., insurer/insuree), service provider relationships (e.g., health provider/recipient, counselor/client, service provider/service recipient, and so on), and other relationships between a first and a second entity that would benefit from express delineation and/or verification. Transactions may include sales transactions (e.g., sales of assets, sales of insurance products), purchase transactions, inquiries (e.g., credit inquires, employment inquiries, etc.), loan transactions, and in general, multi-party transactions, such as two-party transactions.

To create the multi-entity data 200, public key cryptographical infrastructure (e.g., pretty good privacy [PGP] infrastructure) may be used. For example a first entity or institution 202 may own a pair of keys, a private key 204 and a public key 206 created via PGP systems. Likewise, a client 208 of the institution 202 may also own a pair of keys, a private key 210 and a public key 212. To establish a cryptobased relationship, the institution 212 may create a certificate 214, e.g., cryptocertificate, by "verifying" the relationship 200 with their private key 204. For example, the relationship 200 may be encrypted via the private key 204 in conjunction with the customer's public key 212.

The resulting certificate 214 may thus establish, via cryptosecure techniques (e.g., digital signature techniques), that institution 202 has established the relationship 200 with the client 208. Accordingly, the applications 128, 130, 132 may include a set of application programming interfaces (APIs) suitable for creating and managing the distributed ledger-based, multi-entity data 200. In certain embodiments, the APIs may have been created by an independent, non-profit entity, such as a foundation, which maintains the APIs used by the various entities (e.g., institutions 202, 216, customer 208). The foundation may also create and maintain the applications 128, 130, 132, which may be security audited for trustworthiness. The foundation may also aid in issuing certificates of trust, for example, for each institution that certifies that other institutions are compliant and identity-verified in the ecosystem, including the system 100. Possible partnerships with other foundations may also be included, such partnerships with the Electronic Frontier Foundation (EFF). The certificate 214 may then be stored in the blockchain 122, for example as part of the records 104-120. Then, if a second institution 216 wishes to verify that the relationship 200 does indeed exist between the first institution 202 and the client 208, the techniques described herein may apply an information flow process, as further described below with respect to FIG. 4.

Figure 4:
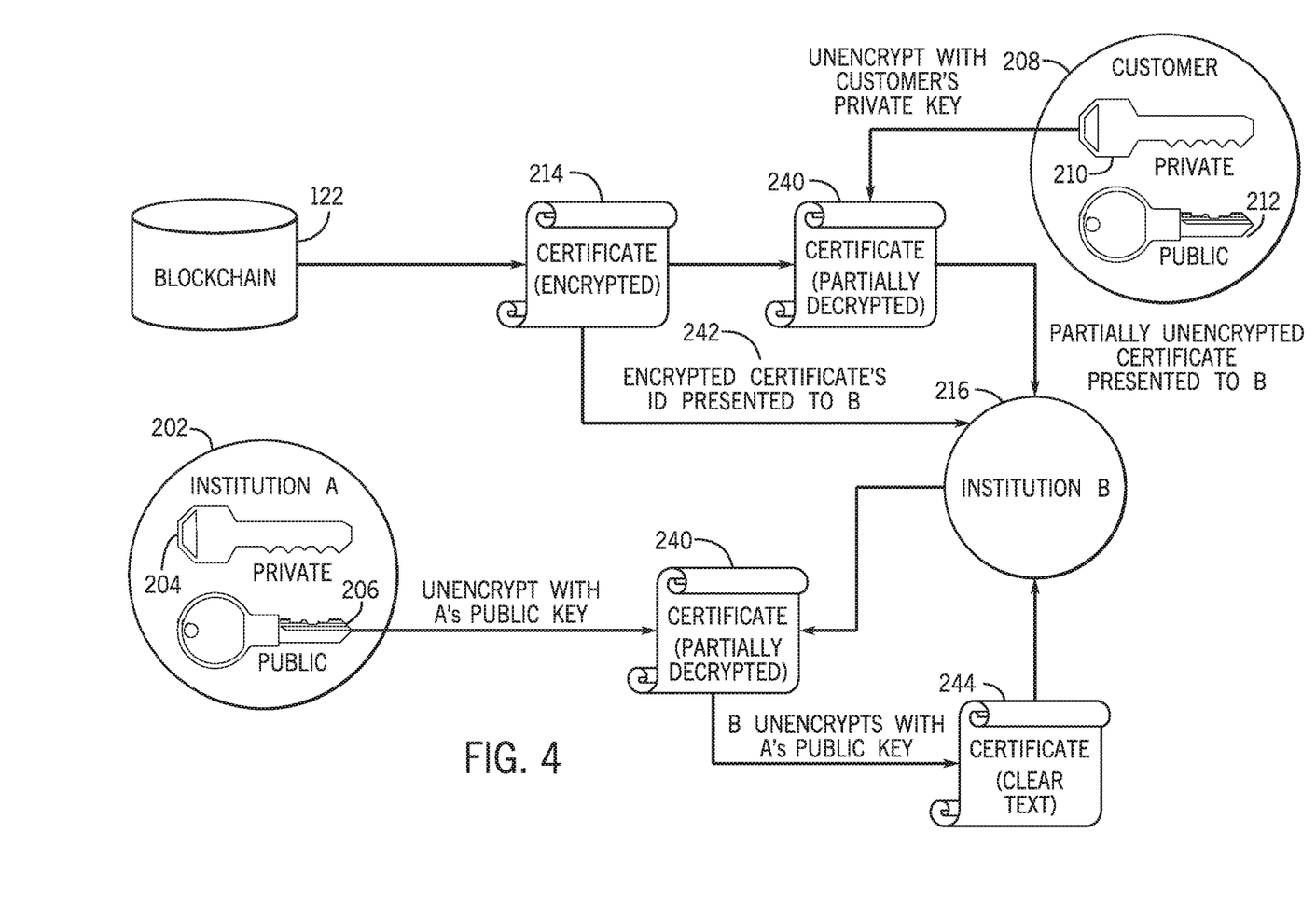
FIG. 4 depicts an information flow diagram of an embodiment of an information flow process suitable for decrypting or otherwise verifying the multi-entity data stored in FIG. 3, according to aspects of the present disclosure.

FIG. 4 is an information flow diagram depicted an embodiment of the application of the blockchain 122 when used to present past information to a new entity, according to aspects of the present disclosure. As shown in the example, the certificate 214, which has been encrypted via the private key 204 of institution 202 and the public key 212 of the customer 208, may be partially decrypted by the customer 208 by using the customer's private key 210, resulting in a partially decrypted certificate 240. The encrypted certificate 214 may include a certificate ID 242, such as a globally unique id (GUID). The second institution 216 may then use the partially decrypted certificate 240, the certificate's ID 242, and the public key 206 of institution 202 to fully decrypt the partially decrypted certificate 240. Accordingly, a decrypted certificate 244 may be derived, which may include the details stored in the multi-entity data 200. By using a combination of blockchain and cryptographic systems, the techniques described herein may provide for a more efficient, secure, and immutable letter of credit system.

Figure 5:
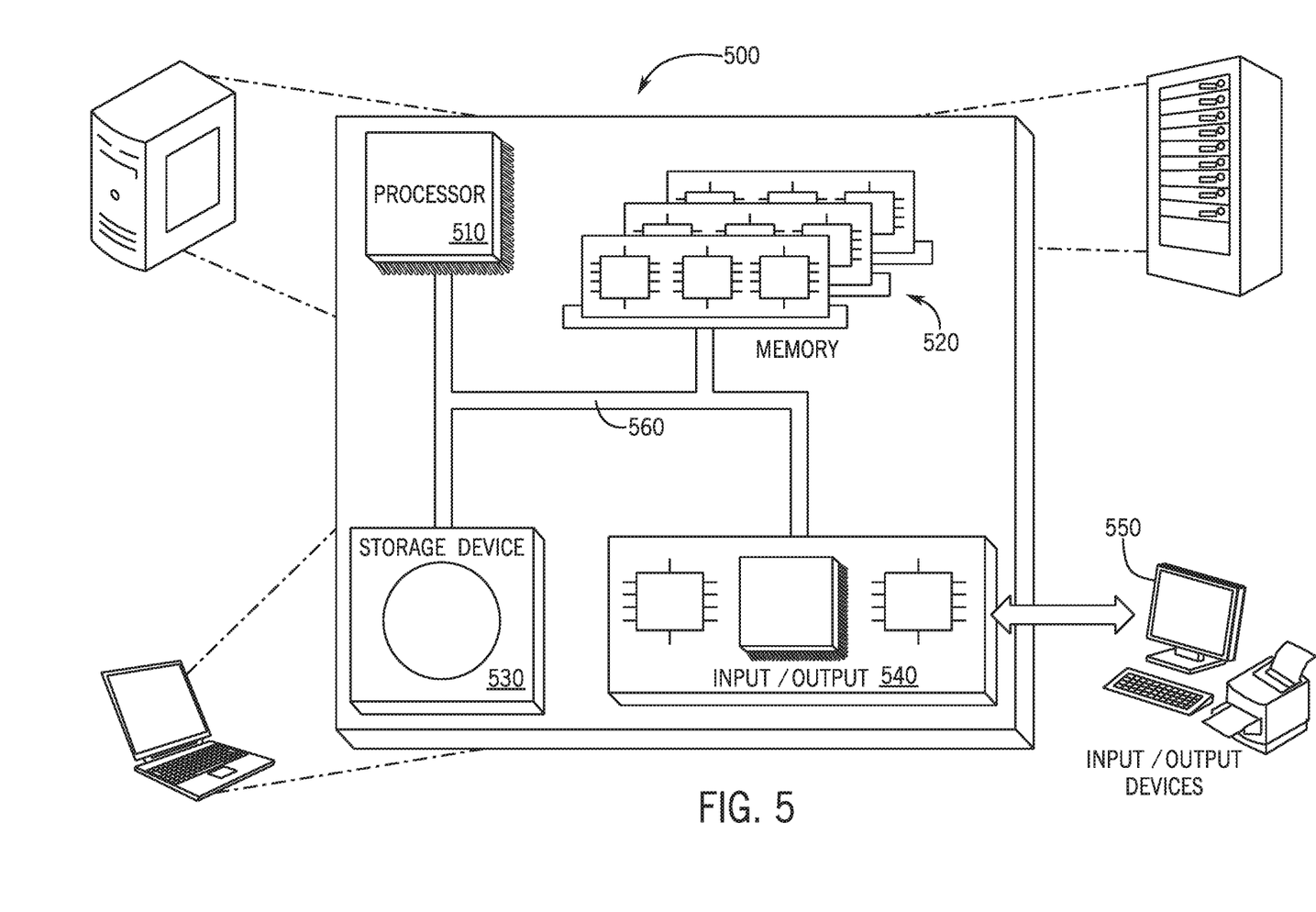
FIG. 5 depicts an example computing system, according to aspects of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device(s) 126, the node(s) that host the distributed ledger 102, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system comprising:
a processor; and
a memory communicatively coupled to the first processor, the memory storing instructions which, when executed, cause the processor to perform operations comprising:
generating, via a cryptographic system, an encrypted certificate indicative of a letter of credit issued by a second entity to a first entity, wherein the encrypted certificate comprises a certificate ID;
storing the encrypted certificate in at least one block of a digital distributed ledger system;
distributing the at least one block among nodes of the digital distributed ledger system, wherein the digital distributed ledger system is configured to immutably store the encrypted certificate; and
after distributing the at least one block among the nodes of the digital distributed ledger system, verifying, via a third entity separate from the first entity and the second entity, the encrypted certificate, wherein the verifying comprises:
partially unencrypting the encrypted certificate by applying a private key of the first entity to derive a partially decrypted certificate; and
unencrypting, via the third entity, the partially decrypted certificate by applying a public key of the second entity and the certificate ID to derive a decrypted certificate.

2. The system of claim 1, wherein establishing, via the cryptographic system, the encrypted certificate comprises encrypting with a public key of the first entity and with a private key of the second entity, wherein the encrypted certificate comprises records of the letter of credit, one or more relationships between the first entity and the second entity, one or more transactions between the first entity and the second entity, or any combination thereof.

3. The system of claim 1, wherein the cryptographic system comprises a Pretty Good Privacy (PGP) system.

4. The system of claim 1, wherein the digital distributed ledger system is configured to immutably store the encrypted certificate via a peer-to-peer network.

5. The system of claim 1, wherein the operations comprise:
updating, by at least one node of the nodes of the digital distributed ledger system, the encrypted certificate based on one or more new transactions associated with the first entity.

6. The system of claim 1, wherein the encrypted certificate comprises credit information associated with the first entity, life insurance information associated with the first entity, health information associated with the first entity, real property information associated with the first entity, personal property information associated with the first entity, rental history information associated with the first entity, employment information associated with the first entity, or a combination thereof.

7. The system of claim 6, wherein the encrypted certificate comprises the credit information and additional information including the life insurance information, the health information, the real property information, the personal property information, the rental history information, the employment information, or a combination thereof, and wherein the operations comprise:
receiving, by at least one node of the nodes of the digital distributed ledger system, a query for the additional information associated with the first entity;
decrypting, by the at least one node, only a portion of the encrypted certificate that includes the additional information; and
transmitting, by the at least one node, the additional information to a display device for display.

8. The system of claim 1, wherein the verifying, via the third entity, the encrypted certificate comprises retrieving the encrypted certificate from the at least one block of the digital distributed ledger system.

9. The system of claim 1, wherein the verifying, via the third entity, the encrypted certificate comprises displaying, via a display device communicatively coupled to the third entity, the letter of credit issued by the second entity to the first entity.

10. The system of claim 1, wherein the certificate ID is a globally unique identification.

11. A method performed by at least one processor, the method comprising:
generating, via a cryptographic system, an encrypted certificate indicative of a letter of credit issued by a second entity to a first entity, wherein the encrypted certificate comprises a certificate ID;

storing the encrypted certificate in at least one block of a digital distributed ledger system;

distributing the at least one block among nodes of the digital distributed ledger system, wherein the digital distributed ledger system is configured to immutably store the encrypted certificate; and after distributing the at least one block among the nodes of the digital distributed ledger system, verifying, via a third entity separate from the first entity and the second entity, the encrypted certificate, wherein the verifying comprises:

partially unencrypting the encrypted certificate by applying a private key of the first entity to derive a partially decrypted certificate; and unencrypting, via the third entity, the partially decrypted certificate by applying a public key of the second entity and the certificate ID to derive a decrypted certificate.

12. The method of claim 11, comprising:
updating, by at least one node of the nodes of the digital distributed ledger system, the encrypted certificate based on one or more new transactions associated with the first entity.

13. The method of claim 11, wherein the encrypted certificate comprises credit information associated with the first entity, life insurance information associated with the first entity, health information associated with the first entity, real property information associated with the first entity, personal property information associated with the first entity, rental history information associated with the first entity, employment information associated with the first entity, or a combination thereof.

14. The method of claim 13, wherein the encrypted certificate comprises the credit information and one or more of: the life insurance information, the health information, the real property information, the personal property information, the rental history information, and the employment information, and wherein the method comprises:

receiving, by at least one node of the nodes of the digital distributed ledger system, a query for the credit information associated with the first entity;

decrypting, by the at least one node, only a portion of the encrypted certificate that includes the credit information; and transmitting, by the at least one node, the credit information to a display device for display.

15. One or more non-transitory computer-readable storage media storing instructions which, when executed, cause at least one processor to perform operations comprising:

generating, via a cryptographic system, an encrypted certificate indicative of a letter of credit issued by a second entity to a first entity, wherein the encrypted certificate comprises a certificate ID;

storing the encrypted certificate in at least one block of a digital distributed ledger system;

distributing the at least one block among nodes of the digital distributed ledger system, wherein the digital distributed ledger system is configured to immutably store the encrypted certificate; and after distributing the at least one block among the nodes of the digital distributed ledger system, verifying, via a third entity separate from the first entity and the second entity, the encrypted certificate, wherein the verifying comprises:

partially unencrypting the encrypted certificate by applying a private key of the first entity to derive a partially decrypted certificate; and unencrypting, via the third entity, the partially decrypted certificate by applying a public key of the second entity and the certificate ID to derive a decrypted certificate.

16. The one or more non-transitory computer-readable storage media of claim 15, wherein establishing, via the cryptographic system, the encrypted certificate comprises encrypting with a public key of the first entity and with a private key of the second entity, wherein the encrypted certificate comprises records of the letter of credit, one or more relationships between the first entity and the second entity, one or more transactions between the first entity and the second entity, or any combination thereof.

17. The one or more non-transitory computer-readable storage media of claim 15, wherein the operations comprise:
updating, by at least one node of the nodes of the digital distributed ledger system, the encrypted certificate based on one or more new transactions associated with the first entity.

18. The one or more non-transitory computer-readable storage media of claim 15, wherein the encrypted certificate comprises credit information associated with the first entity, life insurance information associated with the first entity, health information associated with the first entity, real property information associated with the first entity, personal property information associated with the first entity, rental history information associated with the first entity, employment information associated with the first entity, or a combination thereof.

19. The one or more non-transitory computer-readable storage media of claim 18, wherein the encrypted certificate comprises the credit information and additional information including the life insurance information, the health information, the real property information, the personal property information, the rental history information, the employment information, or a combination thereof, and wherein the operations comprise:

receiving, by at least one node of the nodes of the digital distributed ledger system, a query for the credit information and the additional information associated with the first entity;

decrypting, by the at least one node, only a portion of the encrypted certificate that includes the credit information and the additional information; and transmitting, by the at least one node, the credit information and the additional information to a display device for display.

* * * * *